United States Patent [19]

Desormeaux

[11] Patent Number: 4,801,964
[45] Date of Patent: Jan. 31, 1989

[54] FILL FLASH CONTROL SYSTEM FOR CAMERAS

[75] Inventor: Stephen G. M. Desormeaux, Rochester, N.Y.

[73] Assignee: Eastman Kodak Company, Rochester, N.Y.

[21] Appl. No.: 143,418

[22] Filed: Jan. 13, 1988

[51] Int. Cl.$^4$ .............................................. G03B 15/03
[52] U.S. Cl. .................................. 354/414; 354/417; 354/418; 354/421
[58] Field of Search ............... 354/414, 419, 421, 418, 354/417, 414

[56] References Cited

U.S. PATENT DOCUMENTS

| Re. 31,034 | 9/1982 | Biber et al. | 354/421 |
| 3,855,601 | 12/1974 | Uchiyama et al. | 354/418 |
| 4,063,257 | 12/1977 | Mashimo et al. | 354/418 |
| 4,159,870 | 7/1979 | Corey et al. | 354/417 |
| 4,174,161 | 11/1979 | Mashimo et al. | 354/421 |
| 4,188,103 | 2/1980 | Biber et al. | 354/421 |
| 4,331,400 | 5/1982 | Brownstein et al. | 354/417 |
| 4,373,792 | 2/1983 | Nozawa et al. | 354/414 |
| 4,669,850 | 6/1987 | Uchiyama et al. | 354/421 |

Primary Examiner—Russell E. Adams
Attorney, Agent, or Firm—Roger A. Fields

[57] ABSTRACT

An artificial illumination control system for controlling the energization of an electronic flash device during a photographic exposure interval in a camera has three flash related modes of operation, full flash, no flash, and fill flash, one of which is automatically selected in accordance with the level of ambient light intensity. If, however, the level of ambient light intensity warrants the fill flash mode, but the camera-to-subject distance exceeds a predetermined distance beyond which the flash output may be ineffectual for a fill flash exposure, the fill flash mode is prevented and the control system reverts to its no flash mode.

8 Claims, 4 Drawing Sheets

LOOK UP TABLE MEMORY

| AMBIENT LIGHT LEVEL | FLASH TIMER LIMIT | EXPOSURE INTERVAL TIMER LIMIT |
|---|---|---|
| ≤ 64 f.-l. | $T_2$ | $T_4$ |
| > 64 f.-l. < 500 f.-l. | — | $T_5$ |
| ≥ 500 f.-l. ≤ 11.5 ft. | $T_1$ | $T_3$ |
| ≥ 500 f.-l. > 11.5 ft. | — | $T_3$ |

FILL FLASH CONTROL SYSTEM FOR CAMERAS

CROSS-REFERENCE TO A RELATED APPLICATION

Reference is made to commonly assigned, copending U.S. patent application Ser. No. 143,417 filed Jan. 13, 1988 in the name of Stephen G. Malloy Desormeaux and entitled Smart Flash Control System for Cameras.

BACKGROUND OF THE INVENTION

1. Field of the Invention

The invention relates generally to the field of photography, and specifically to an artificial illumination control system for a camera. More particularly, the invention relates to an artificial illumination control system for controlling the energization of a source of artificial illumination in a normal (or full) flash mode of operation, where ambient light levels are too low for a proper daylight exposure, and in a fill (or fill-in) flash mode of operation, where ambient light levels are relatively high but certain portions of the subject to be photographed have significantly less light falling on them than surrounding portions of the subject.

2. Description of the Prior Art

When taking a picture under conditions at which the levels of ambient light intensity are relatively high, such as in bright sun, but certain portions of the subject to be photographed have significantly less light falling on them than surrounding portions of the subject, resulting in the formation of dark shadows on the subject, it is desirable to provide additional scene illumination from a source of artificial illumination, such as an electronic flash device, sometimes referred to as a "strobe" unit. Situations where a source of artificial illumination are used in relatively high ambient light levels are commonly referred to as a "fill" or "fill-in" mode of flash operation.

Cameras were recently introduced several years ago, for example the KODAK MEDALIST VR 35 Camera, manufactured by Eastman Kodak Company, Rochester, N.Y., which include a manually operated fill-flash switch. The fill-flash switch must be manually closed to provide a fill flash mode of operation for a built-in electronic flash unit, and it must be held closed at the same time the shutter release button is depressed to initiate the photographic exposure interval. Conversely, in the normal flash mode of operation for use in dimly lighted surroundings, the electronic flash unit is automatically energized.

Other known cameras operate an electronic flash unit either in a normal flash mode or in a fill flash mode each time a picture is taken. Typically, in these cameras, the flash output is varied in accordance with the ambient light level.

Still other cameras inhibit, i.e. render inoperative, an electronic flash unit or shift the control mode of the camera from flash photography to daylight photography whenever the subject to be photographed is located beyond an adequately operable distance for the flash output. See U.S. Pat. No. 4,501,481 granted Feb. 26, 1985. The Cross-Referenced Application The application cross-referenced above discloses a "smart" flash control system which operates selectively in one of three flash related modes based only upon ambient light levels. The control system operates in a fill flash mode whenever the ambient light level is equal to or greater than a predetermined high (bright) level, providing the same flash output in all cases of bright light. Conversely, the control system operates in a full flash mode whenever the ambient light level is less than or equal to a predetermined low (dim) value, and it provides the same flash output in this mode as in the fill flash mode. If, however, the ambient light level falls somewhere between the predetermined low level and the predetermined high level, the control system operates in a no flash (ambient) mode where no artificial illumination is provided.

SUMMARY OF THE INVENTION

According to the invention, there has been devised an improved artificial illumination control system where, when the level of ambient light intensity warrants a fill flash mode, but the camera-to-subject distance exceeds a predetermined distance beyond which the flash output may be ineffectual for a fill flash exposure, the fill flash mode is prevented and the control system reverts to a no flash mode.

More particularly, there has been devised an improved artificial illumination control system for controlling the energization of an electronic flash device during a photographic exposure interval in a camera, wherein (a) light level detecting means provides a measure of the level of ambient light intensity, (b) flash triggering means for energizing said electronic flash device is operated in a fill flash mode to enable a fill flash exposure, and (c) camera-to-subject distance detecting means provides a measure of the camera-to-subject distance, and wherein the improvement comprises:

comparator means for determining that the measure of the level of ambient light intensity provided by said light level detecting means is equal to or greater than a certain light related value, and for determining whether the measure of the camera-to-subject distance provided by said camera-to-subject distance detecting means is less than or equal to a certain distance related value or is greater than that value; and control means, acting subsequent to said comparator means determining both that said measure of the level of ambient light intensity is equal to or greater than the light related value and said measure of the camera-to-subject distance is less than or equal to the distance related value, for operating said flash triggering means in its fill flash mode, and acting subsequent to said comparator means determining both that said measure of the level of ambient light intensity is equal to or greater than the light related value and said measure of the camera-to-subject distance is greater than the distance related value, for preventing operation of said flash triggering means in the fill flash mode, whereby a fill flash exposure will automatically be selected or prevented only in accordance with both the level of ambient light intensity and the camera-to-subject distance.

DETAILED DESCRIPTION OF THE PREFERRED EMBODIMENT

The invention is disclosed as being embodied preferably in a conventional 35mm camera having a built-in electronic flash unit. Because such a camera is well known, this description is directed in particular to photographic elements forming part of or cooperating directly with the disclosed embodiment. It is to be understood, however, that other elements not specifically shown or described may take various forms known to persons of ordinary skill in the art.

Figure 1:
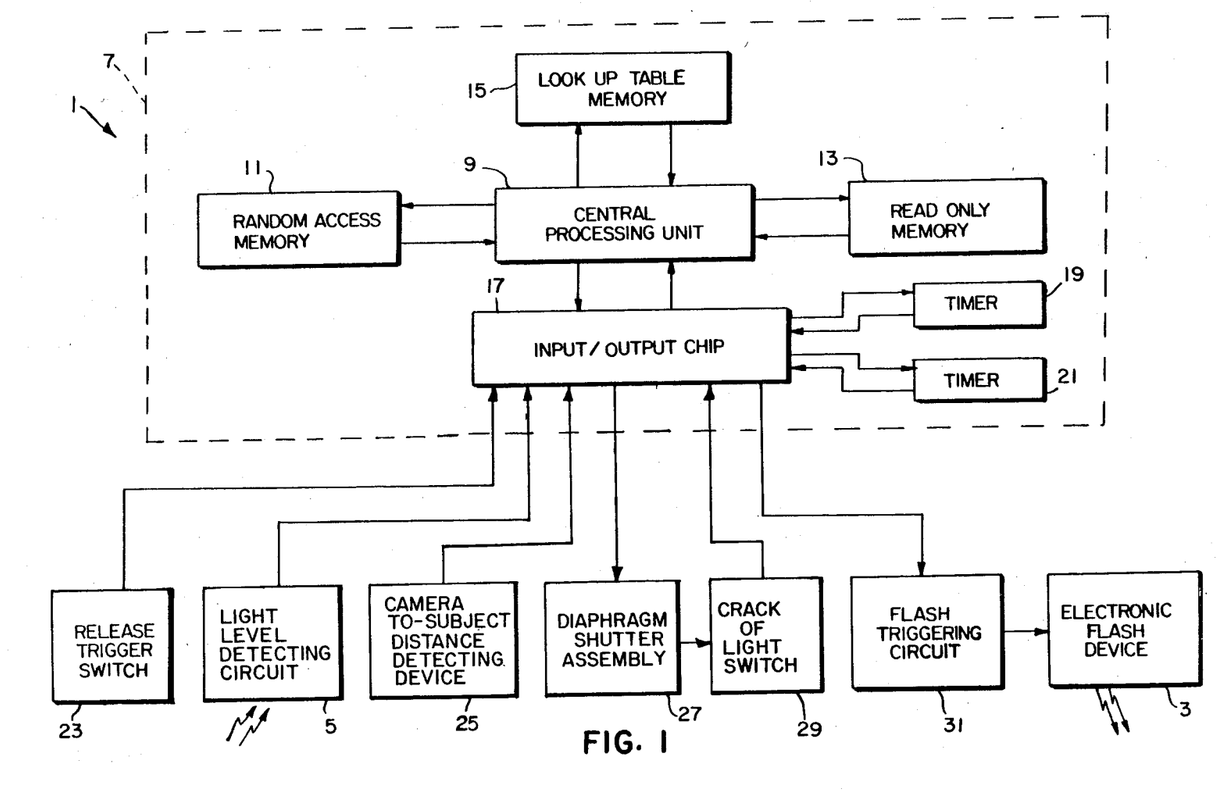
FIG. 1 is a block diagram of a flash control system for a camera according to a preferred embodiment of the invention.

Referring now to the drawings, FIG. 1 depicts a flash control system 1 for controlling the energization of a conventional electronic flash device 3 during a photographic exposure interval in a 35mm camera. According to the invention, the control system 1 has three flash related modes of operation, full (or normal) flash, no flash, and fill (or fill-in) flash, one of which is automatically selected, each time the exposure interval is commenced, in accordance with a measure of the level of ambient light intensity provided by a conventional light level detecting circuit 5.

As shown in FIG. 1, the control system 1 includes, in addition to the electronic flash device 3 and the light level detecting circuit 5, a conventional microcomputer 7 having a microprocessor or central processing unit (CPU) 9, a volatile random access memory (RAM) 11, a non-volatile read-only memory (ROM) 13, a look-up table memory 15, an input/output (I/O) chip 17, a flash timer 19, and an exposure interval timer 21. Moreover, a normally open release trigger switch 23 is shown which is closed in response to manually depressing a shutter release button, not shown, on the body of the camera. A conventional, preferably automatic, camera-to-distance detecting device 25, i.e. an automatic focus device, is shown which is operated to focus an objective lens, not shown, and to provide a measure of the camera-to-subject distance. A conventional diaphragm shutter assembly 27 is shown which is opened to commence the exposure interval and closed to terminate the exposure interval in response to its receipt of respective control signals from the microcomputer 7. A normally open "crack of light" switch 29 is shown which is closed each time the diaphragm shutter assembly 27 is initially opened. A conventional flash triggering circuit 31 for energizing the electronic flash device 3 is shown which is operated by the microcomputer 7 in a full flash mode to enable a full flash exposure and is operated in a fill flash mode to enable a fill flash exposure.

Figure 2:
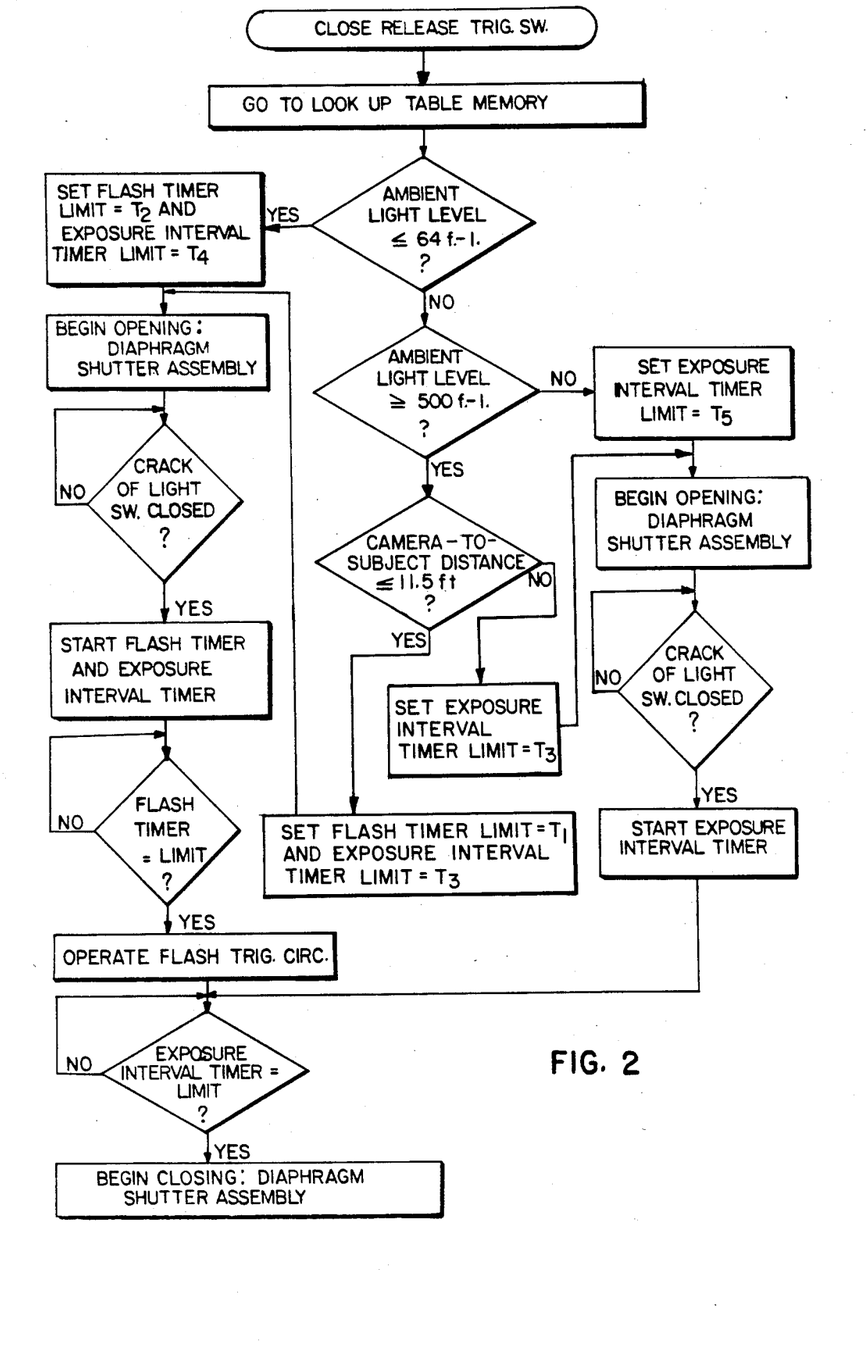
FIG. 2 is a microcomputer flow chart depicting the various steps of operation of the flash control system.

FIG. 2 is a flow chart for the microcomputer 7, depicting the various steps of operation of the flash control system 1. When the release trigger switch 23 is closed in response to manual depression of the shutter release button, the microcomputer 7 interrogates its look-up table memory 15 to determine whether the measure of the level of ambient light intensity provided by the light level detecting circuit 5 either is less than or equal to 64 foot-lamberts, which is too low for a proper daylight exposure, is greater than 64 foot-lamberts but less than 500 foot-lamberts, or is equal to or greater than 500 foot-lamberts, which is bright enough that shadowed areas of the subject to be photographed may result. In the case where the microcomputer 7 determines that the level of ambient light intensity is equal to or greater than 500 foot-lamberts, a further interrogation of the look-up table memory 15 is made to determine whether the measure of camera-to-subject distance provided by the camera-to-subject distance detecting device 25 is less than or equal to 11.5 feet or is greater than 11.5 feet. This distance is the maximum camera-to-subject distance suitable for a fill flash exposure in the example at hand. Following the appropriate determination, one of the three flash related modes, full flash, no flash, or fill flash is automatically selected.

(a) Full Flash Mode Steps

1. If, as shown in the flow chart of FIG. 2 and in the look-up table of FIG. 3, the measure of the level of ambient light intensity provided by the light level detecting circuit 5 is less than or equal to 64 foot-lamberts, the limit or duration of the flash timer 19 is set to $T_2$ seconds and the limit or duration of the exposure interval timer 21 is set to $T_4$ seconds. $T_4$ seconds is longer in duration than $T_2$ seconds—see FIG. 5.

Figure 5:
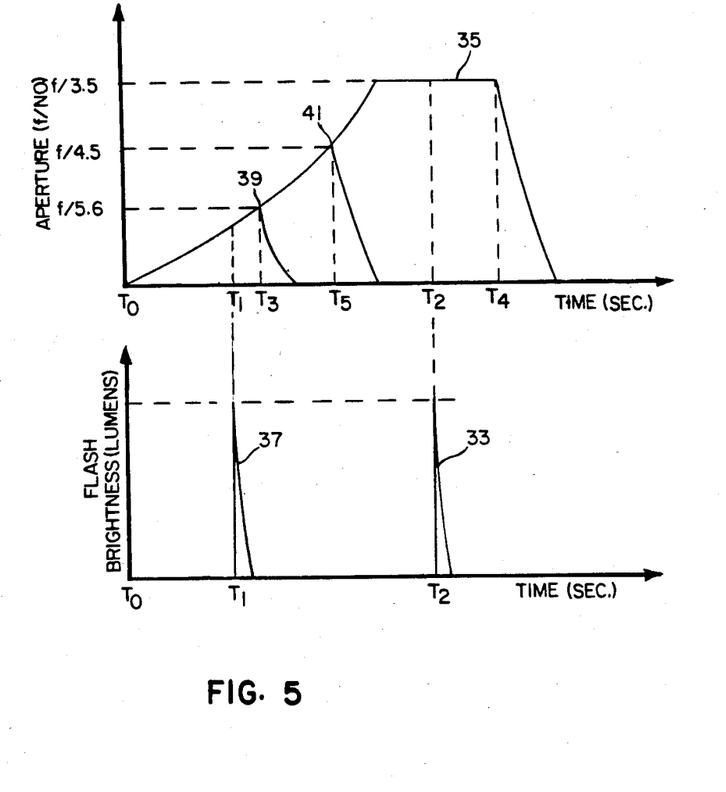
FIG. 5 is a graph-like chart comparing the exposure interval and the flash or no flash interval in each of the three modes of operation of the flash control system.

2. Then, as shown in the flow chart of FIG. 2, the microcomputer 7 issues a control signal to begin opening of the diaphragm shutter assembly 27, to commence the exposure interval. The exposure interval begins at $T_0$ seconds, as shown in FIG. 5.

3. Initial opening of the diaphragm shutter assembly 27 closes the crack of light switch 29 via a suitable known mechanism, not shown.

4. Closure of the crack of light switch 29 instructs the microcomputer 7 to simultaneously start the flash timer 19 and the exposure interval timer 21 at $T_0$ seconds.

5. When the flash timer 19 reaches the limit to which it has been set, in this instance $T_2$ seconds, the microcomputer 7 issues a control signal that operates the flash triggering circuit 31 to energize the electronic flash device 3. As shown in FIG. 5, the resulting flash discharge at $T_2$ seconds is typical. That is, it is very brief and intense, with virtually no firing delay. In FIG. 5, the area under the "spike" 33 represents the full flash output in lumen-seconds.

6. When the exposure interval timer 21 reaches the limit to which it has been set, in this instance $T_4$ seconds, the microcomputer 7 issues a control signal to begin closing of the diaphragm shutter assembly 27, to terminate the exposure interval. In FIG. 5, the area under the largest curve 35 represents the exposure interval for a full flash exposure.

(b) Fill Flash Mode Steps

Figure 3:
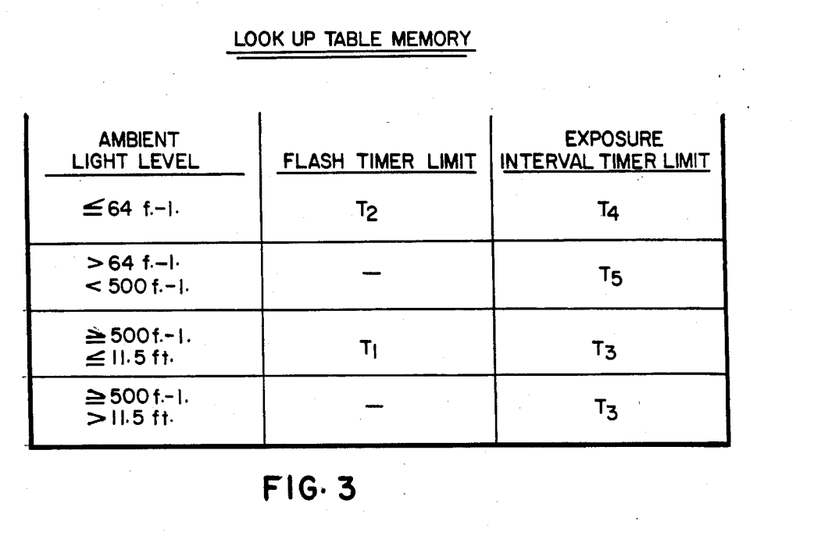
FIG. 3 is a schematic diagram of the contents of a non-volatile look-up table memory included in the flash control system.

1. If, as shown in FIGS. 2 and 3, the measure of the level of ambient light intensity provided by the light level detecting circuit 5 is equal to or greater than 500 foot-lamberts, and the measure of the camera-to-subject distance provided by the camera-to-subject distance detecting device 25 is less than or equal to 11.5 feet, the limit or duration of the flash timer 19 is set to $T_1$ seconds and the limit or duration of the exposure interval timer 21 is set to $T_3$ seconds. $T_3$ seconds is longer in duration than $T_1$ seconds (and each of these times is shorter in duration than $T_2$ seconds or $T_4$ seconds)—see FIG. 5.

2. Then, as shown in FIG. 2, the microcomputer 7 issues the control signal to begin opening of the diaphragm shutter assembly 27, to commence the exposure interval. The exposure interval begins at $T_0$ seconds, as shown in FIG. 5.

3. Initial opening of the diaphragm shutter assembly 27 closes the crack of light switch 29.

4. Closure of the crack of light switch 29 instructs the microcomputer 7 to simultaneously start the flash timer 19 and the exposure timer 21 at $T_0$ seconds.

5. When the flash timer 19 reaches the limit to which it has been set, in this instance $T_1$ seconds, the microcomputer 7 issues the control signal that operates the flash triggering circuit 31 to energize the electronic flash device 3. As shown in FIG. 5, the resulting flash discharge at $T_1$ seconds yields a fill flash output represented by the area under the spike 37. Note that the fill flash output 37 and the full flash output 33 in FIG. 5 are identical; that is, they have the same peak intensity and the same duration. The only difference between the two flash outputs is the time of introduction, $T_1$ or $T_2$.

6. When the exposure interval timer 21 reaches the limit to which it has been set, in this instance $T_3$ seconds, the microcomputer 7 issues the control signal to begin closing of the diaphragm shutter assembly 27, to terminate the exposure interval. In FIG. 5, the area under the smallest curve 39 represents the exposure interval for a fill flash exposure whenever the control system 1 is operated in the fill flash mode.

(c) No Flash Mode Steps

1. If, as shown in FIGS. 2 and 3, the measure of the level of ambient light intensity provided by the light level detecting circuit 5 is greater than 64 foot-lamberts but less than 500 foot-lamberts, the limit or duration of the exposure interval timer 21 is set for $T_5$ seconds (no limit or duration is set for the flash timer 19). $T_5$ seconds is between $T_3$ seconds and $T_4$ seconds as to duration—see FIG. 5.

Alternate 1. If, as shown in FIGS. 2 and 3, the measure of the level of ambient light intensity provided by the light level detecting circuit 5 is equal to or greater than 500 foot-lamberts, and the measure of the camera-to-subject distance provided by the camera-to-subject distance detecting device 25 is greater than 11.5 feet, the limit or duration of the exposure interval timer 21 is set for $T_3$ seconds (no limit or duration is set for the flash timer 19).

2. Then, in either case, as shown in FIG. 2, the microcomputer 7 issues the control signal to begin opening of the diaphragm shutter assembly 27, to commence the exposure interval. The exposure interval begins at $T_0$ seconds, as shown in FIG. 5.

3. Initial opening of the diaphragm shutter assembly 27 closes the crack of light switch 29.

4. Closure of the crack of light switch 29 instructs the microcomputer to start the exposure interval timer 21 (but not the flash timer 19) at $T_0$ seconds.

5. When the exposure interval timer 21 reaches the limit to which it has been set, in this instance either $T_3$ or $T_5$ seconds, the microcomputer 7 issues the control signal to begin closing of the diaphragm shutter assembly 27, to terminate the exposure interval. In FIG. 5, the area under the midsize curve 41 represents the exposure interval for an ambient light (no flash) exposure whenever the level of ambient light intensity is greater than 64 foot-lamberts and less than 500 foot-lamberts. Moreover, the area under the smallest curve 39 represents the exposure interval for an ambient light exposure whenever the level of ambient light intensity is equal to or greater than 500 foot-lamberts and the camera-to-subject distance is greater than 11.5 feet.

Figure 4:
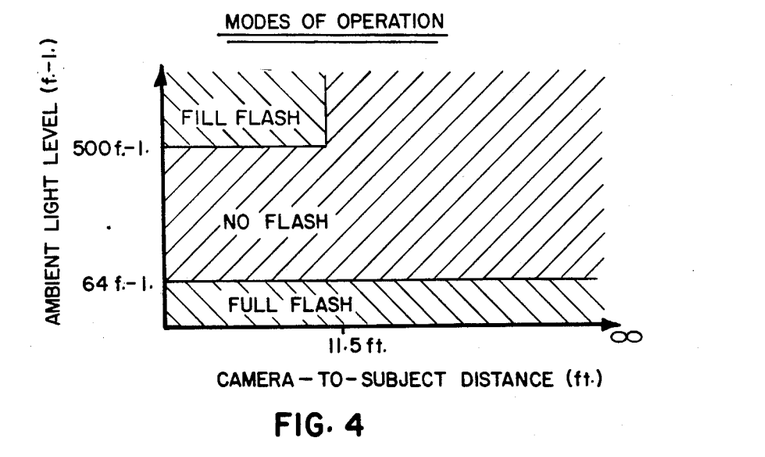
FIG. 4 is a schematic diagram depicting three flash related modes of operation, fill flash, no flash, and fill flash, of the flash control system.

Accordingly, with the control system 1, either a full flash exposure or a no flash exposure will automatically be selected in accordance with only the level of ambient light intensity, and either a fill flash exposure or a no flash exposure will automatically be selected in accordance with both the level of ambient light intensity and the camera-to-subject distance. This is illustrated in schematic fashion in FIG. 4.

The invention has been described with reference to a preferred embodiment. However, it will be appreciated that variations and modifications can be effected within the ordinary skill in the art without departing from the scope of the invention. For example in the preferred embodiment, the three exposure interval curves 35, 39, and 41 assume a film speed of ASA 100. With other film speeds, the curves of course would be somewhat different as to aperture and/or as to the closing times $T_4$, $T_3$, and $T_5$. Also, the flash output spikes 33 and 37 for full flash and fill flash might be somewhat different as to the times $T_2$ amd $T_1$.

In the preferred embodiment, the exposure interval curves 35, 39, and 41 are limited to three in number. However, it will be appreciated that this number can be increased. Also, the control system can be made more sophisticated simply by increasing the number of light level zones in the look-up table memory 15.

I claim:

1. An improved artificial illumination control system for controlling the energization of an electronic flash device during a photographic exposure interval in a camera, wherein (a) light level detecting means provides a measure of the brightness level of ambient light intensity, (b) flash triggerng means for energizing said electronic flash device is operated in a fill flash mode to enable a fill flash exposure, and (c) camera-to-subject distance detecting means provides a measure of the camera-to-subject distance, and wherein the improvement comprises:

comparator means for determining that the measure of the level of ambient light intensity provided by said light level detecting means is equal to or greater than a minimum bright light level for a fill flash exposure, and for determining whether the measure of the camera-to-subject distance provided by said camera-to-subject distance detecting means is less than or equal to a maximum distance for a fill flash exposure or is greater than that distance; and control means, acting subsequent to said comparator means determining both that said measure of the level of ambient light intensity is equal to or greater than the minimum bright light level and said measure of the camera-to-subject distance is less than or equal to the maximum distance, for operating said flash triggering means in its fill flash mode, and acting subsequent to said comparator means determining that said measure of the level of ambient light intensity is equal to or greater than the minimum bright light level but said measure of the camera-to-subject distance is greater than the maximum distance, for preventing operation of said flash triggering means in the fill flash mode.

2. The improvement as recited in claim 1, wherein said minimum bright light level corresponds to an ambient light level which is bright enough that at least certain areas of the subject to be photographed may be significantly shadowed, and said maximum distance corresponds to a camera-to-subject distance which is small enough to ensure that the fill flash output will lighten shadowed areas of the subject during a fill flash exposure.

3. An improved artificial illumination control system for controlling the energization of an electronic flash device during a photographic exposure interval in a camera, wherein (a) light level detecting means provides a measure of the level of ambient light intensity, (b) flash triggering means for energizing said electronic flash device is operated in a fill flash mode to enable a fill flash exposure and is not operated to allow a no flash mode for a daylight exposure, and (c) camera-to-subject distance detecting means provides a measure of the camera-to-subject distance, and wherein the improvement comprises:

comparator means for determining whether the measure of the level of ambient light intensity provided by said light level detecting means is equal to or greater than a minimum bright light level for a fill flash exposure or is less than that level, and for determining whether the measure of the camera-to-subject distance provided by said camera-to-subject distance detecting means is less than or equal to a maximum distance for a fill flash exposure or is greater than that distance; and control means, acting subsequent to said comparator means determining both that said measure of the level of ambient light intensity is equal to or greater than the minimum bright light level and said measure of the camera-to-subject distance is less than or equal to the maximum distance, for operating said flash triggering means in its fill flash mode, and acting subsequent to said comparator means determining either only that said measure of the level of ambient light intensity is less than the light related value or both that said measure of the level of ambient light intensity is equal to or greater than the minimum bright light level and said measure of the camera-to-subject distance is greater than the maximum distance, for preventing operation of said flash triggering means in the fill flash mode to allow said no flash mode.

4. An improved artificial illumination control system for controlling the energization of an electronic flash device during a photographic exposure interval in a camera, wherein (a) light level detecting means provides a measure of the level of ambient light intensity, (b) flash triggering means for energizing said electronic flash device is operated in a full flash mode to enable a full flash exposure and is operated in a fill flash mode to enable a fill flash exposure, and (c) camera-to-subject distance detecting means provides a measure of the camera-to-subject distance, and wherein the improvement comprises:

comparator means for determining whether the measure of the level of ambient light intensity provided by said light level detecting means is less than or equal to a first light related value or is equal to or greater than a second light related value, and for determining whether the measure of the camera-to-subject distance provided by said camera-to-subject distance detecting means is less than or equal to a certain distance related value or is greater than that value; and control means, acting subsequent to said comparator means determining only that said measure of the level of ambient light intensity is less than or equal to the first light related value, for operating said flash triggering means in its full flash mode regardless of the camera-to-subject distance, acting subsequent to said comparator means determining both that said measure of the level of ambient light intensity is equal to or greater than the second light related value and said measure of the camera-to-subject distance is less than or equal to the distance related value, for operating said flash triggering means in its fill flash mode, and acting subsequent to said comparator means determining both that said measure of the level of ambient light intensity is equal to or greater than the second light related value and said measure of the camera-to-subject distance is greater than the distance related value, for preventing operation of said flash triggering means in the fill flash mode, whereby a fill flash exposure will automatically be selected and prevented in accordance with both the level of ambient light intensity and the camera-to-subject distance and a full flash exposure will automatically be selected in accordance with only the level of ambient light intensity.

5. An improved artificial illumination control system for controlling the energization of an electronic flash device during a photographic exposure interval in a camera, wherein (a) light level detecting means provides a measure of the level of ambient light intensity, (b) flash triggering means for energizing said electronic flash device is operated in a full flash mode to enable a full flash exposure and is operated in a fill flash mode to enable a fill flash exposure, and (c) camera-to-subject distance detecting means provides a measure of the camera-to-subject distance, and wherein the improvement comprises:

comparator means for determining whether the measure of the level of ambient light intensity provided by said light level detecting means is less than or equal to a first light related value, is greater than the first value but less than a second light related value, or is equal to or greater than the second value, and for determining whether said measure of the camera-to-subject distance provided by said camera-to-subject distance detecting means is less than or equal to a certain distance related value or is greater than that value; and control means, acting subsequent to said comparator means determining only that said measure of the level of ambient light intensity is less than or equal to the first light related value, for operating said flash triggering means in its full flash mode regardless of the camera-to-subject distance, acting subsequent to said comparator means determining both that said measure of the level of ambient light intensity is equal to or greater than the second light related value and said measure of the camera-to-subject distance is less than or equal to the distance related value, for operating said flash triggering means in its fill flash mode, and acting subsequent to said comparator means determining either that said measure of the level of ambient light intensity is greater than the first light related value but less than the second light related value or that said measure of the level of ambient light intensity is equal to or greater than the second value and said measure of the camera-to-subject distance is greater than the distance related value, for preventing operation of said flash triggering means in the fill flash mode, whereby a full flash exposure or a non-flash exposure or a fill flash exposure will automatically be selected.

6. An improved artificial illumination control system for controlling the energization of an electronic flash device during a photographic exposure interval in a camera, wherein there can be selected a fill flash mode of operation for providing a fill flash exposure, and wherein the improvement comprises:

means for automatically preventing selection of said fill flash mode, whenever the level of ambient light intensity is high enough as in bright sun to warrant a fill flash exposure but the camera-to-subject distance exceeds a maximum distance beyond which the flash output may substantially be ineffectual for a fill flash exposure.

7. An improved artificial illumination control system for controlling the energization of an electronic flash device during a photographic exposure interval in a camera, wherein there can be selected a fill flash mode of operation for providing a fill flash exposure and a no flash mode of operation for providing a daylight exposure, and wherein the improvement comprises:

means for automatically preventing selection of said fill flash mode and automatically selecting said no flash mode, whenever the level of ambient light intensity is high enough as in bright sun to warrant a fill flash exposure but the camera-to-subject distance exceeds a maximum distance beyond which the flash output may be ineffectual for a fill flash exposure.

8. An improved artificial illumination control system for controlling the energization of an electronic flash device during a photographic exposure interval in a camera, wherein there can be selected a fill flash mode of operation for providing a fill flash exposure, a no flash mode of operation for providing a daylight exposure, and a full flash mode of operation for providing a full flash exposure, and wherein the improvement comprises:

means for automatically preventing selection of said fill flash mode and automatically selecting said no flash mode, whenever the level of ambient light intensity is bright enough as in bright sun to warrant a fill flash exposure but the camera-to-subject distance exceeds a maximum distance beyond which the flash output may be ineffectual for a fill flash exposure, and for automatically selecting said full flash mode regardless of the camera-to-subject distance, whenever the level of ambient light intensity is dim enough to warrant a full flash exposure.

* * * * *

UNITED STATES PATENT OFFICE
CERTIFICATE OF CORRECTION

PATENT NO. : 4,801,964
DATED : January 31, 1989
INVENTOR(S) : S. G. MALLOY DESORMEAUX It is certified that error appears in the above-identified patent and that said Letters Patent is hereby corrected as shown below:

No. 19 &

No. 75-Front Page, Last name of the inventor should read
--MALLOY DESORMEAUX--.

Signed and Sealed this

Eighth Day of August, 1989

Attest:

DONALD J. QUIGG

Attesting Officer

Commissioner of Patents and Trademarks